United States Patent
Cherouat et al.

(10) Patent No.: US 10,113,473 B2
(45) Date of Patent: Oct. 30, 2018

(54) COOLING SYSTEM FOR AN ELECTRICALLY DRIVEN VEHICLE

(75) Inventors: Hatem Cherouat, Antony (FR); Samuel Cregut, Saint-Remy les-Chevreuse (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 438 days.

(21) Appl. No.: 14/238,595

(22) PCT Filed: Jul. 3, 2012

(86) PCT No.: PCT/FR2012/051544
§ 371 (c)(1),
(2), (4) Date: Apr. 16, 2014

(87) PCT Pub. No.: WO2013/024215
PCT Pub. Date: Feb. 21, 2013

(65) Prior Publication Data
US 2014/0216682 A1 Aug. 7, 2014

(30) Foreign Application Priority Data
Aug. 17, 2011 (FR) ...................... 11 57366

(51) Int. Cl.
F01P 3/20 (2006.01)
B60K 11/02 (2006.01)
B60K 1/00 (2006.01)

(52) U.S. Cl.
CPC ................ *F01P 3/20* (2013.01); *B60K 11/02* (2013.01); *B60K 2001/003* (2013.01);
(Continued)

(58) Field of Classification Search
CPC ......... F01P 3/20; F01P 2037/00; B60K 11/02; B60K 2001/003
(Continued)

(56) References Cited

U.S. PATENT DOCUMENTS 4,369,738 A * 1/1983 Hirayama ............... F01P 7/165
123/41.1
4,381,736 A * 5/1983 Hirayama ............... F01P 7/164
123/41.1
(Continued)

FOREIGN PATENT DOCUMENTS

GB 2 383 840 7/2003
WO 2009 056926 5/2009
(Continued)

OTHER PUBLICATIONS

French Search Report dated Apr. 19, 2012 in Application No. FR 1157366 Filed Aug. 17, 2011.
(Continued)

*Primary Examiner* — Raheena R Malik
(74) *Attorney, Agent, or Firm* — Oblon, McClelland, Maier & Neustadt, L.L.P.

(57) ABSTRACT

A cooling system for an electrically driven motor vehicle, including a central computing unit, a cooling circuit including at least a pump for circulation of a coolant fluid, a solenoid valve, and a radiator. The cooling circuit is configured for cooling a battery charger and an electrical motor connected to an electronic control device. The central computing unit is configured to manage activation of each pump, including potential faults of each of the pumps.

10 Claims, 3 Drawing Sheets

(52) U.S. Cl.
CPC .. *B60K 2001/005* (2013.01); *B60K 2001/006* (2013.01); *F01P 2023/08* (2013.01); *F01P 2037/00* (2013.01)

(58) Field of Classification Search
USPC .................. 165/11.1, 202; 123/41.15, 41.44
See application file for complete search history.

(56) References Cited

U.S. PATENT DOCUMENTS

| | | | | |
|---|---|---|---|---|
| 4,936,105 | A * | 6/1990 | Takechi | F25D 29/00 165/11.1 |
| 6,016,774 | A * | 1/2000 | Bokkers | F01P 5/06 123/41.1 |
| 6,213,233 | B1 * | 4/2001 | Sonntag | B60H 1/004 123/142.5 R |
| 6,450,275 | B1 * | 9/2002 | Gabriel | B60K 6/22 165/41 |
| 7,377,237 | B2 * | 5/2008 | Carney | B60K 11/02 123/41.12 |
| 8,733,299 | B2 * | 5/2014 | Cregut | B60K 1/00 123/2 |
| 2003/0127528 | A1 | 7/2003 | Sabhapathy et al. | |
| 2006/0202046 | A1 * | 9/2006 | Eberspach | B60H 1/00314 237/12.3 A |
| 2010/0121508 | A1 | 5/2010 | Murata et al. | |
| 2012/0067562 | A1 * | 3/2012 | Cregut | B60K 1/00 165/287 |
| 2012/0132394 | A1 * | 5/2012 | Oberti | B60K 1/00 165/51 |
| 2013/0014499 | A1 * | 1/2013 | Gray, Jr. | B60K 6/12 60/327 |
| 2013/0056194 | A1 * | 3/2013 | Cregut | B60K 11/02 165/300 |

FOREIGN PATENT DOCUMENTS

| | | | | |
|---|---|---|---|---|
| WO | WO 2010116106 | A1 * | 10/2010 | ............ B60K 1/00 |
| WO | WO 2011077020 | A1 * | 6/2011 | ............ B60K 11/02 |

OTHER PUBLICATIONS

International Search Report dated Jan. 16, 2013 in PCT/FR12/051544 Filed Jul. 3, 2012.

* cited by examiner

COOLING SYSTEM FOR AN ELECTRICALLY DRIVEN VEHICLE

The invention relates to a cooling system for a motor vehicle with electrical propulsion. This vehicle can be either electric with exclusively electrical propulsion, or hybrid with mixed propulsion involving an electric motor and an explosion engine. As far as cooling is concerned, the requirements between vehicles with electrical propulsion and vehicles provided with an explosion engine are not the same. For a vehicle with an explosion engine, the cooling system is conventionally equipped with a pump attached to the engine, making it possible to circulate the coolant through the radiator, said combustion engine and an exchanger to heat the passenger compartment. The flow rate is a direct function of the engine speed (zero when the engine is stopped). In the case of a vehicle with electrical propulsion, there is a need to cool not only the various elements of the traction chain that makes it possible for said vehicle to run, but also the charger, when the vehicle is stopped, to enable the battery to be recharged from a domestic electrical network. The different cooling phases of the electric motor and of the charger are implemented by means of at least one electric pump, enabling the coolant to circulate with a given flow rate.

In order to eliminate any ambiguity as to the interpretation of certain words, it is important to stress that the terms "strategy" and "method" as used in the description are equivalent.

A cooling system for a vehicle with electrical propulsion, must not only be effective in the different phases of use of the vehicle, comprising essentially running, stoppage, charging of the battery and changing of the battery, but also upon the potential failure of certain elements of the cooling circuit, such as the electric fluid circulation pumps. In practice, untimely and lasting overheating phases of the electric motor and/or of the charger are particularly feared, because they can lead to significant damage to the vehicle and render it unusable. The cooling strategies developed in the context of a cooling system according to the invention make it possible to ensure an effective cooling of the electric motor during all the phases of use of the vehicle, by taking into account the more or less defective state of operation of certain elements of the cooling circuit, and particularly of the electric pumps.

The subject of the invention is a cooling system for a motor vehicle provided with electrical propulsion, comprising a central processing unit and a cooling circuit comprising at least one pump for circulating a coolant, a solenoid valve and a radiator, said circuit being intended to cool a battery charger and an electric motor associated with an electronic control device. The main feature of a cooling system according to the invention is that the computing central processing unit is configured to manage the activation of each pump by integrating the potential failures of each of said pumps. In practice, the pumps are predominant elements of the cooling system, because they govern the coolant flow rate and are therefore able to deliver a more or less rapid cooling, being able to be adapted to the different situations encountered, such as, for example, the accidental overheating of a member. It is therefore important for suitable cooling to be present at any point in the life of the vehicle, regardless of the state of operation of each pump, without which there is a risk of unacceptable overheating of the charger or of the electric motor. To be efficient, complete and safe, the cooling system must therefore be able to cover all the possible situations during the phases of use of the vehicle, such as stoppage, running, changing of the battery or charging thereof, and must be able to mitigate any potential failure of each pump. A failed pump covers the case where it reacts to a control command but without producing the required setpoint, and the case where it no longer reacts to a control command by being totally inoperative. The solenoid valve can be activated to allow or prevent the passage of the coolant in the charger, and constitutes an essential element in the cooling system that makes it possible to multiply the different cooling strategies to be put in place, according to the circumstances. The coolant can, for example, consist of water.

Preferentially, the central processing unit implements cooling control methods, to manage a high temperature of the members, or to implement sleep denial phases of the computing central processing unit. It covers a non-exhaustive list of essential particular cases to be well managed in terms of cooling, during the different phases of use of the vehicle, to avoid degrading certain elements such as the electric motor or the charger.

Advantageously, the cooling circuit comprises a first pump used in running mode and a second pump used in battery recharging mode, the flow rate of each of said pumps being able to be set by a specific control signal delivered by the central processing unit. The introduction of at least two pumps into the cooling circuit increases the versatility of a cooling system according to the invention, compared to a configuration for which there would be only one pump, by multiplying the possible combinations of use between the latter. This makes the cooling systems more complete and therefore more effective. Indeed, a multiplicity of pumps could be added to the cooling circuit to further increase the efficiency of the cooling system, but it would then be necessary to take account of the resultant bulk and of the cost overhead generated. Two pumps make it possible to obtain sufficient cooling system efficiency, and a reduced bulk and reduced costs. Furthermore, the presence of two pumps increases the compensation possibilities, in the case where one of the two pumps happens to be defective or fail.

Preferentially, the specific control signal for the first and the second pumps is a signal of pulse width modulation (PWM) type.

Advantageously, the cooling control methods implemented by the computing central processing unit are developed from a first computing module responsible for creating a coolant flow rate command regardless of the phase of use of the vehicle, and from a second computing module integrating the failure modes of each pump by taking into account the phase of use of said vehicle. If the cooling circuit comprises only one pump and the latter is defective, the computing central processing unit will develop a cooling strategy which will tend to use this failing pump optimally by taking account of its reduced capabilities. An optimized use means a use with lesser efficiency, but without risk of further damaging the defective pump. If the circuit comprises at least two pumps, the cooling control strategies will allow for a use of both pumps by introducing, for example, weighting coefficient for each of them, taking into account their respective failure state.

Preferentially, the input parameters of the two modules are the temperature of the coolant used to cool the electric motor, the temperature of the coolant used to cool the charger, the internal temperature of the charger, the internal temperature of the motor, the internal temperature of the electronic control device of said motor, a signal indicating the status of the vehicle, a failure synthesis signal for each pump, and a signal which reflects the denial or acceptance of putting the computer to sleep, the output parameters being, for each pump, a cooling setpoint which is expressed as a percentage of the maximum flow rate that can be produced thereby.

Advantageously, the cooling system comprises at least one regulator.

According to a first preferred embodiment of a cooling system according to the invention, the cooling system comprises a regulator for each pump.

According to a second preferred embodiment of a cooling system according to the invention, the cooling system comprises several pumps and a single regulator provided for all of these pumps.

Advantageously, the cooling system comprises a regulator for each phase of use of the vehicle.

Preferentially, the second module is designed to process three possible configurations for each pump, which are normal operation, degraded mode operation and non-operation. In this way, not only does the cooling system make it possible to monitor and control all the cooling operations during the different phases of use of the vehicle in normal operation of all of the elements of the cooling circuit, but it also incorporates several safety levels, making it possible to take account of a partial or total failure of each pump. The term failure is general and covers the two configurations for which each pump is partially degraded but reacts to a control command without producing the required setpoint, and the situations for which each pump no longer reacts to a control command. By taking into account the state of failure of each pump, the cooling strategies created by the computing central processing unit minimize, even cancel, the risks of accidental overheating of the charger or of the electric motor and therefore guarantee an increased life for said vehicles.

Advantageously, the different temperatures used as input data for the modules are measured by means of sensors. The sensors are placed at strategic points making it possible to ensure a reliable temperature reading in all circumstances. By way of example, a single sensor can be employed to measure the cooling temperature used to cool both the engine block and the charger. Although this is a more economical configuration, the measurements risk proving less accurate.

The cooling systems according to the invention offer the advantage of being configured, not only to ensure an effective and reliable cooling of the battery charger and of the electric motor during the different phases of use of the vehicle, during normal operation of all of the elements of the cooling circuit, but also in degraded operation or in the event of a complete failure of each pump. In practice, the cooling strategies that they integrate have been designed to manage this kind of critical situation that can be greatly prejudicial to the vehicle concerned.

A detailed description of a preferred embodiment of a cooling system according to the invention is given herein below, with reference to FIGS. 1 to 3.

Figure 1:
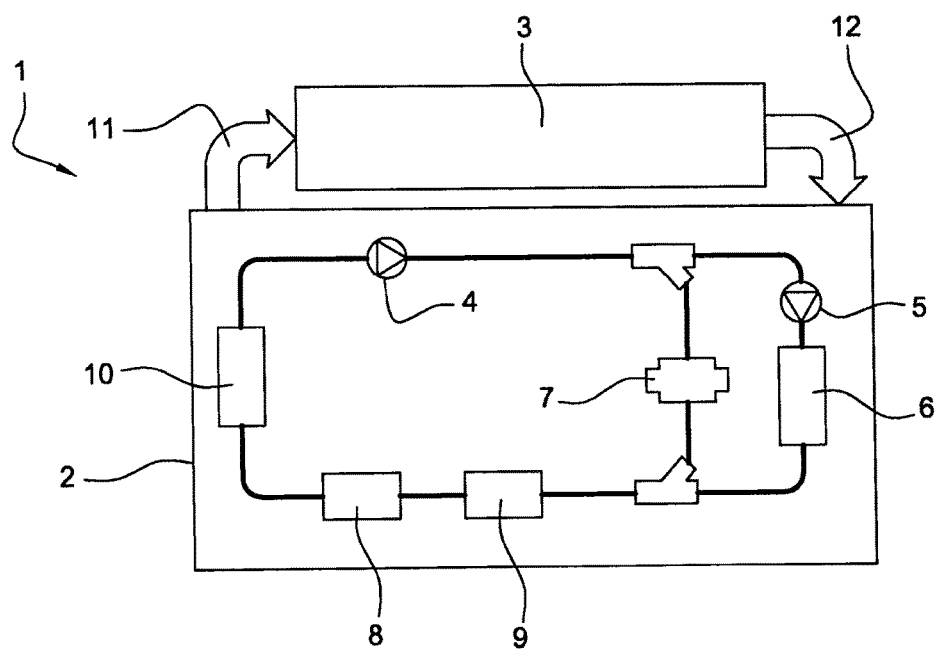
FIG. 1 is a simplified view of a cooling system according to the invention.

Referring to FIG. 1, a cooling system 1 according to the invention comprises a cooling circuit 2 and a computing central processing unit 3 hosting the strategy for creating the coolant flow rate command. The cooling circuit 2 comprises a first electric pump 4 used in running mode and whose flow rate can be set using a control signal of pulse width modulation (PWM) type, a second electric pump 5 used in battery recharging mode and whose flow rate can also be set using a control signal of PWM type, a charger 6 making it possible, when the vehicle is stopped, to recharge the battery from the domestic electrical network, a solenoid valve 7 for short-circuiting the charger 6 when the vehicle is in running phase, an electric motor 8 and its control electronics 9 which both have to be cooled in the running phase, and the radiator 10 which makes it possible to cool the coolant in a manner similar to that which exists in a combustion engine. The cooling circuit 2 is equipped with various sensors making it possible notably to measure different temperatures, said measurements 11 supplying the computing central processing unit 3 to create the appropriate coolant flow rate control strategy 12.

Figure 2:
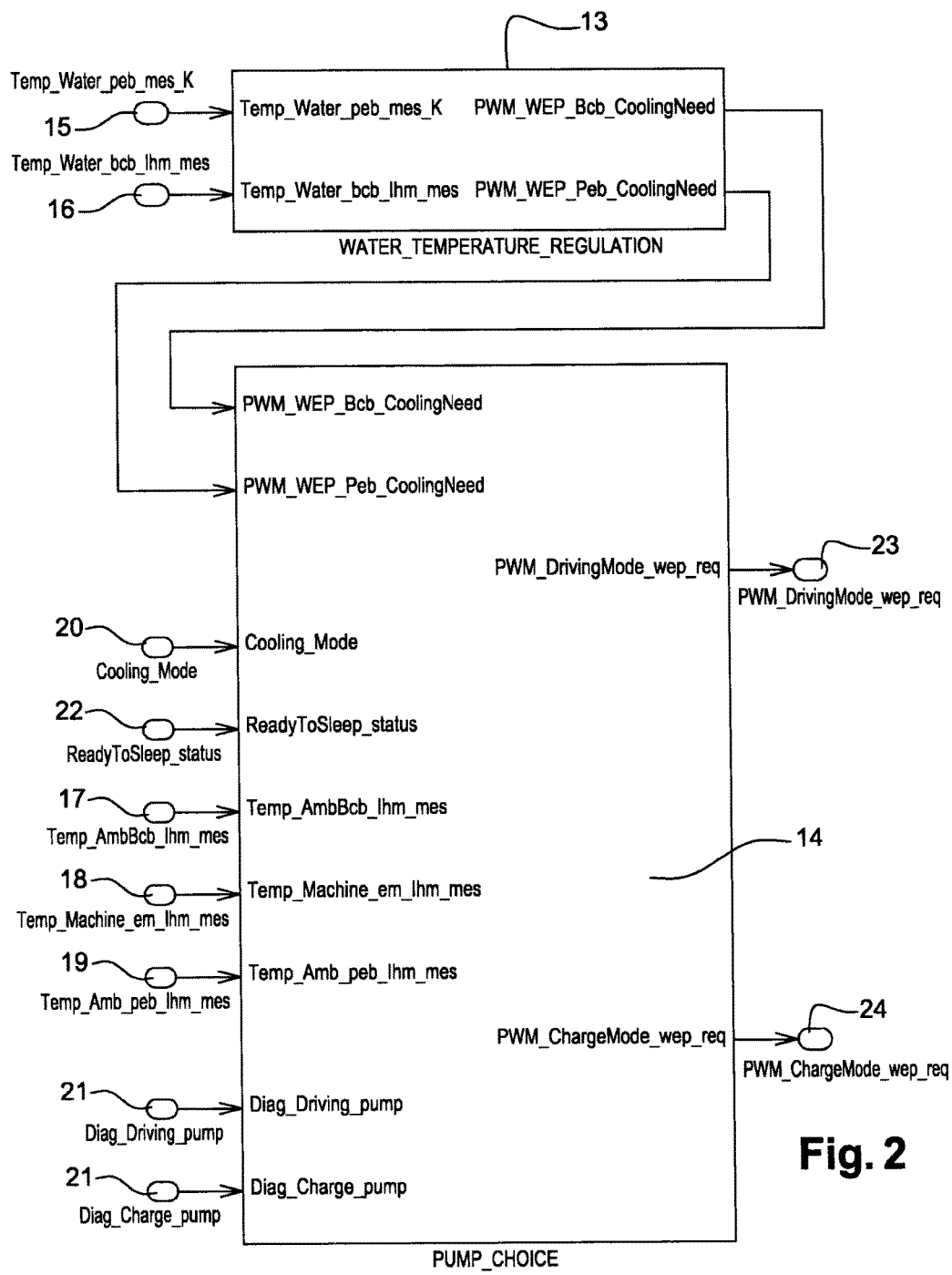
FIG. 2 is a flow diagram showing an input module and an output module schematically representing the strategy for creating the flow rate command, hosted in the computing central processing unit of a cooling system according to the invention.

Referring to FIG. 2, the strategy for creating the coolant flow rate command is developed from two computing modules 13, 14, one 13 being responsible for creating a flow rate command which is valid regardless of the phase of use of the vehicle, which can, for example, be running or charging the battery, the other module 14 making it possible to select the appropriate pump or pumps 4, 5 by integrating their failure mode. The strategy inputs are as follows:

15—'Temp_Water_peb_mes_K': this is the temperature of the coolant used to cool the electric motor 8 and its control electronics 9.

16—'Temp_Water_bcb_Ihm_mes': this is the temperature of the coolant used to cool the charger 6. These two temperatures can be measured from a single sensor (in this case, there is a single temperature measurement that will be duplicated to control the flow rate of each of the pumps) which represents an economical solution but one that is a little less accurate and optimal than in the case where the temperatures are measured at two different points of the coolant.

17—'Temp_AmbBcb_Ihm_mes': this is the internal temperature of the charger 6.

18—'Temp_Machine_em_Ihm_mes': this is the internal temperature of the motor 8.

19—'Temp_Amb_peb_Ihm_mes': this is the internal temperature of the control electronics 9 of the motor 8.

20—'Cooling_ Mode': this is a signal from the central computer of the vehicle which indicates the phase of use of the vehicle (running, charging, stoppage, charging battery).

21—A failure synthesis signal for each pump 4, 5. This signal can contain functional diagnostics, feedback from the electronics of the pump 4, 5, or even electrical diagnostics on the control wire, this status is: pump 4, 5 operating normally, pump in degraded mode, pump failed.

22—A signal which expresses the denial or acceptance of putting the computer 3 to sleep.

The outputs of the strategy are as follows:

23—'PWM_DrivingMode_wep_req': this is the flow rate command for the pump 4 used in running mode; it is a signal between 0 and 100 expressing a percentage of the maximum flow rate that can be produced by the pump.

24—'PWM_ChargeMode_wep_req: this is the flow rate command for the pump 5 used in vehicle battery recharging mode; it is a signal between 0 and 100 expressing a percentage of the maximum flow rate that can be produced by the pump.

The outputs of the first module 13 are a cooling setpoint for the first pump 4 used in running mode and a cooling setpoint for the second pump 5 used in recharging mode. These setpoints are computed using at least one regulator, which can be a proportional integral regulator, or a proportional integral derivative regulator, the function of which is to adjust the flow rate demand as a function of the difference between the measured temperatures and the reference temperatures.

Figure 3:
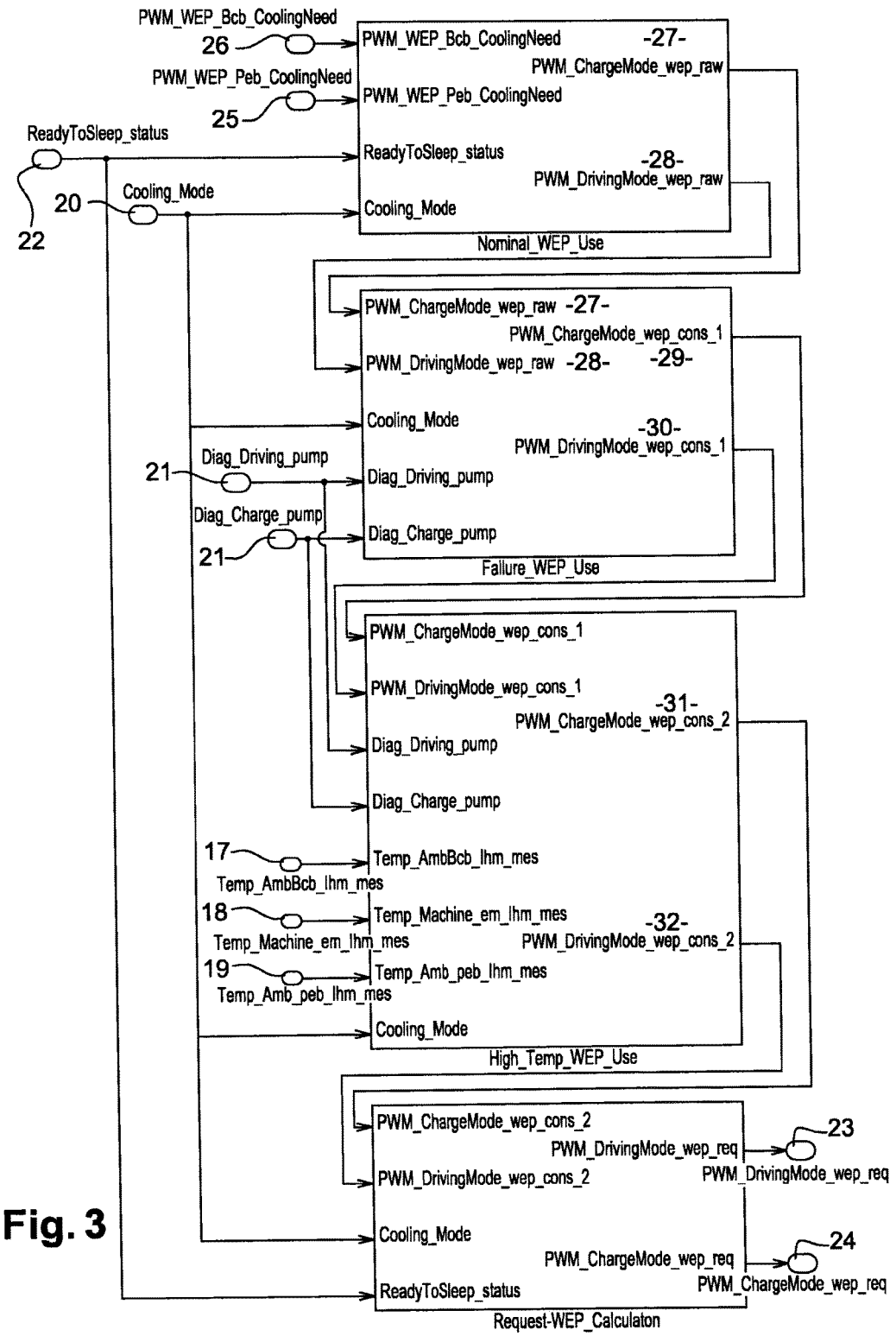
FIG. 3 is a flow diagram detailing the output module of FIG. 2.

Since the objective of the invention is to protect the members against insufficient cooling, and to optimize the use of the pumps 4, 5 by permanently using the correct pump 4, 5 depending on whether there is a failure or not, or according to the nature of the failure mode, the second module 14, which integrates the status of said pumps 4, 5, makes it possible to carry out the following four successive operations, as represented in FIG. 3:

a) Nominal_WEP_Use: in this block, depending on the mode (charging, running) and the sleep status (if the computer 3 is to be put to sleep after the end of running or charging), the setpoints are assigned according to the following logic:

if in charging mode, the output of the first module 13 PWM_WEP_Bcb_CoolingNeed 26 is assigned to the second pump 5 used in recharging mode. The first pump 4 used in running mode receives, as setpoint, the stop request instead of PWM_WEP_Peb_CoolingNeed 25 if in running mode, the output of the first module 13 PWM_WEP_Peb_CoolingNeed 25 is assigned to the first pump 4 used in running mode. The second pump 5 used in recharging mode receives, as setpoint, the stop request instead of PWM_WEP_Bcb_CoolingNeed 26 if in neither charging nor running mode, and there is a denial of putting the computer 3 to sleep in the case of a high temperature for example, cooling is continued by using the setpoint of the last mode (if, for example, it was running mode and the step after is neither charging nor running nor battery exchange, and there is a denial to put the computer 3 to sleep, then cooling is continued by using running setpoint PWM_WEP_Peb_CoolingNeed 25 with the first pump 4 used in running mode).

According to another embodiment, it may be decided to always use the same pump, independently of the prior status, and with a setpoint from the regulator or else a fixed setpoint.

b) Failure_WEP_Use: in this block, there are, as inputs, the two flows produced by the first block that will be named PWM_ChargeMode_wep_raw 27 and PWM_DrivingMode_wep_raw 28, the diagnostic signals 21 for the pumps 4, 5, and the mode of use of the vehicle (charging, running).

In the diagnostic signals, the following cases will be differentiated:

Pump 4, 5 in normal operating mode.

Pump 4, 5 operating in degraded mode, this mode designates a pump 4, 5 which is not producing the desired setpoint and which is therefore uncontrollable, but functional. In this mode, either the pump 4, 5 operates at full speed, or at a fixed speed supplied by the manufacturer).

Pump 4, 5 stopped because of a failure (pump failed).

The outputs of this block are PWM_ChargeMode_wep_cons_1 29 and PWM_DrivingMode_wep_cons_1 30 and are computed as follows:

Case 1: If in charging mode and the second pump 5 used in charging mode has failed, PWM_ChargeMode_wep_cons_1=Stopped.
PWM_DrivingMode_wep_cons_1=PWM_ChargeMode_wep_raw.

Case 2: If in charging mode and the second pump 5 used in charging mode is in degraded mode, PWM_ChargeMode_wep_cons_1=PWM_ChargeMode_wep_raw.
PWM_DrivingMode_wep_cons_1=Stopped.

Case 3: If in charging mode and the first pump 4 used in running mode is in degraded mode, PWM_ChargeMode_wep_cons_1=Stopped.
PWM_DrivingMode_wep_cons_1=PWM_ChargeMode_wep_raw.

Case 4: If in running mode and the first pump 4 used in running mode has failed, PWM_ChargeMode_wep_cons_1=PWM_DrivingModep_wep_raw.
PWM_DrivingMode_wep_cons_1=Stopped.

Case 5: If in running mode and the first pump 4 used in running mode is in degraded mode, PWM_ChargeMode_wep_cons_1=Stopped.
PWM_DrivingMode_wep_cons_1=PWM_DrivingMode_wep_raw.

Case 6: If in running mode and the second pump 5 used in charging mode is in degraded mode, PWM_ChargeMode_wep_cons_1=PWM_DrivingMode_wep_raw.
PWM_DrivingMode_wep_cons_1=Stopped.

To sum up, if a pump 4, 5 has failed, the other pump 4, 5 is used, and if a pump 4, 5 is in degraded mode, it is the latter which is used. In all cases, there is always one pump 4, 5 running at the output of this block.

c) High_Temp_WEP_Use: in this block, the inputs are PWM_ChargeMode_wep_cons_1 29 and PWM_DrivingMode_wep_cons_1 30 (the outputs of the preceding block), the temperatures of the members to be cooled (motor 8, control electronics 9, and charger 6), the diagnostic signals 21 for the pumps 4, 5, and the mode of use of the vehicle (charging, running).

The outputs of this block are PWM_ChargeMode_wep_cons_2 31 and PWM_DrivingMode_wep_cons_2 32 and are computed as follows:

If in charging mode and the charger 6 reaches a determined temperature threshold that is estimated to be critical and the second pump 5 has not failed then, initially, the following applies:

PWM_ChargeMode_wep_cons_2=Max setpoint.
PWM_DrivingMode_wep_cons_2=PWM_DrivingMode_wep_cons_1.

And if, after a certain time, the temperature of the charger 6 does not drop below a second threshold lower than the first threshold and the first pump 4 has not failed, then the outputs of the block will be:

PWM_ChargeMode_wep_cons_2=Max setpoint.
PWM_DrivingMode_wep_cons_2=Max setpoint.

If in running mode and the motor 8 or the control electronics 9 reaches a determined temperature threshold that is estimated to be critical and the first pump 4 has not failed, then, initially, the following applies:

PWM_ChargeMode_wep_cons_2=PWM_ChargeMode_wep_cons_1.
PWM_DrivingMode_wep_cons_2=Max setpoint.

And if, after a certain time, the temperature of the motor 8 or of the control electronics 9 does not drop below a second threshold lower than the first and the second pump 5 has not failed, then the outputs of the block will be:

PWM_ChargeMode_wep_cons_2=Max setpoint.
PWM_DrivingMode_wep_cons_2=Max setpoint.

It should be noted that the case of one of the pumps 4, 5 in degraded mode is covered here, because the aim of this block is to increase the flow rate in the circuit 2 to improve the heat exchange by actuating both pumps 4, 5 at the same time. With this logic, even if a pump 4, 5 is in degraded mode (it is already activated), both pumps 4, 5 will be activated.

In both cases, if one of the pumps 4, 5 has failed, it keeps the same setpoint computed in the preceding block.

d) Request_WEP_Calculation:

This block constitutes the final arbitration of the pump commands 4, 5.

Case A—if in running or charging mode, the setpoints computed in the preceding blocks are applied.

Case B—if there is a request to stop cooling and the temperatures permit it (no high temperature), the setpoints are changed to stop setpoints.

Case C—the last case is the case of battery exchange. Given that, in this mode, a certain number of measurements are lost, in particular the temperatures of the members 6, 8, 9, all the computation steps are cancelled and the commands are set with the last values used before the appearance of this mode.

The invention claimed is:

1. A cooling system for a motor vehicle including electrical propulsion, comprising:
    a central processing unit;
    a cooling circuit comprising at least one pump for circulating a coolant;
    a solenoid valve; and
    a radiator;
    the cooling circuit configured to cool a battery charger and an electric motor associated with an electronic control device;
    wherein the central processing unit is configured to receive diagnostic information including a partial failure status for said at least one pump and phase of use information indicating a phase of use of the vehicle, and manage activation of each pump based on the received diagnostic information and phase of use information, which includes optimizing use of said-partial failure status of each of the pumps.

2. The cooling system as claimed in claim 1, wherein the central processing unit implements cooling control methods, to manage a high temperature of at least the battery charger and electric motor, or to implement sleep denial phases of the central processing unit.

3. The cooling system as claimed in claim 1, wherein the cooling circuit comprises a first pump used in running mode, and a second pump used in battery recharging mode, wherein a flow rate of each of the first and second pumps is set by a specific control signal delivered by the central processing unit.

4. The cooling system as claimed in claim 3, wherein the specific control signal for the first and the second pumps comprises a pulse width modulation signal.

5. The cooling system as claimed in claim 1, further comprising at least one regulator.

6. The cooling system as claimed in claim 1, wherein optimizing use of said partial failing status of each of the pumps is performed without risk of further damaging each pump with said partial failing status.

7. A cooling system for a motor vehicle it electrical propulsion, comprising:
    a central processing unit;
    a cooling circuit comprising at least one pump for circulating a coolant;
    a solenoid valve; and
    a radiator;
    the cooling circuit configured to cool a battery charger and an electric motor associated with an electronic control device;
    wherein the central processing unit is configured to receive diagnostic information including a partial failure status for said at least one pump, and manage activation of each pump based on the received diagnostic information, which includes optimizing use of said partial failure status of each of the pumps,
    wherein the central processing unit implements cooling control methods, to manage a high temperature of at least the battery charger and electric motor, to implement sleep denial phases of the central processing unit, and
    wherein the cooling control methods implemented by the computing central processing unit are implemented by a first computing module responsible for creating a coolant flow rate command regardless of a phase of use of the vehicle, and a second computing module integrating failure modes of each pump based on said diagnostic information and by taking into account the phase of use of the vehicle.

8. The cooling system as claimed in claim 7,
    wherein input parameters of the first and second computing modules comprise temperature of the coolant used to cool the electric motor, temperature of the coolant used to cool the charger, internal temperature of the charger, internal temperature of the motor, internal temperature of an electronic control device of the motor, a signal indicating status of the vehicle, a failure synthesis signal for each pump, and a signal that reflects denial or acceptance of putting the central processing unit to sleep, and
    wherein output parameters of the two modules are, for each pump, a cooling setpoint which is expressed as a percentage of a maximum flow rate that can be produced thereby.

9. The cooling system as claimed in claim 7, wherein the second computing module is configured to process three possible configurations for each pump, comprising: normal operation, degraded mode operation, and non-operation.

10. The cooling system as claimed in claim 8, further comprising sensors configured to measure the temperatures used as input data for the modules.

* * * * *